(12) United States Patent
Eckhart

(10) Patent No.: US 6,629,704 B2
(45) Date of Patent: Oct. 7, 2003

(54) VEHICLE STEERING COLUMN

(75) Inventor: Richard J. Eckhart, Buck Creek, IN (US)

(73) Assignee: TRW Inc., Lyndhurst, OH (US)

( * ) Notice: Subject to any disclaimer, the term of this patent is extended or adjusted under 35 U.S.C. 154(b) by 135 days.

(21) Appl. No.: 09/809,478

(22) Filed: Mar. 15, 2001

(65) Prior Publication Data

US 2002/0130504 A1 Sep. 19, 2002

(51) Int. Cl.[7] .................................................. B62D 1/16
(52) U.S. Cl. ............................................ 280/779; 74/492
(58) Field of Search ................................. 280/775, 777, 280/779; 74/492; 384/537

(56) References Cited

U.S. PATENT DOCUMENTS

| | | | |
|---|---|---|---|
| 4,481,838 A | | 11/1984 | Findley et al. |
| 5,588,332 A | * | 12/1996 | Hedderly ................. 74/492 |
| 5,802,221 A | | 9/1998 | Luthi et al. |
| 5,802,924 A | | 9/1998 | Johnson et al. |
| 5,911,789 A | * | 6/1999 | Keipert et al. ............. 280/775 |

FOREIGN PATENT DOCUMENTS

| | | | | |
|---|---|---|---|---|
| AU | 649931 | * | 9/1992 | .................. 74/492 |
| DE | 1505730 | * | 8/1970 | ................. 280/777 |
| DE | 199 42 247 C1 | | 1/2001 | |
| GB | 1065316 | | 4/1967 | |
| GB | 2151566 | * | 7/1985 | |
| JP | 60-193762 | * | 10/1985 | .................. 74/492 |
| JP | 6-156286 | * | 6/1994 | .................. 74/492 |

* cited by examiner

Primary Examiner—Eric Culbreth
(74) Attorney, Agent, or Firm—Tarolli, Sundheim, Covell & Tummino L.L.P.

(57) ABSTRACT

A vehicle steering column (10) comprises a one-piece steering column member (12) that includes a plurality of elongate wall portions (20–24) that extend generally parallel to a longitudinal axis (28) of the steering column. The plurality of wall portions (20–24) at least partially define a chamber (26) in the member (12) for receiving an axially extending steering shaft (30) of the vehicle. The member (12) has a generally rectangular exterior configuration. The member (12) includes a vehicle mounting portion (90, 92) formed as one piece with the elongate wall portions (20–24). The vehicle mounting portion (90, 92) extends from the wall portions (20–24) and is adapted for fastening the steering column member (10) to the vehicle body.

12 Claims, 3 Drawing Sheets

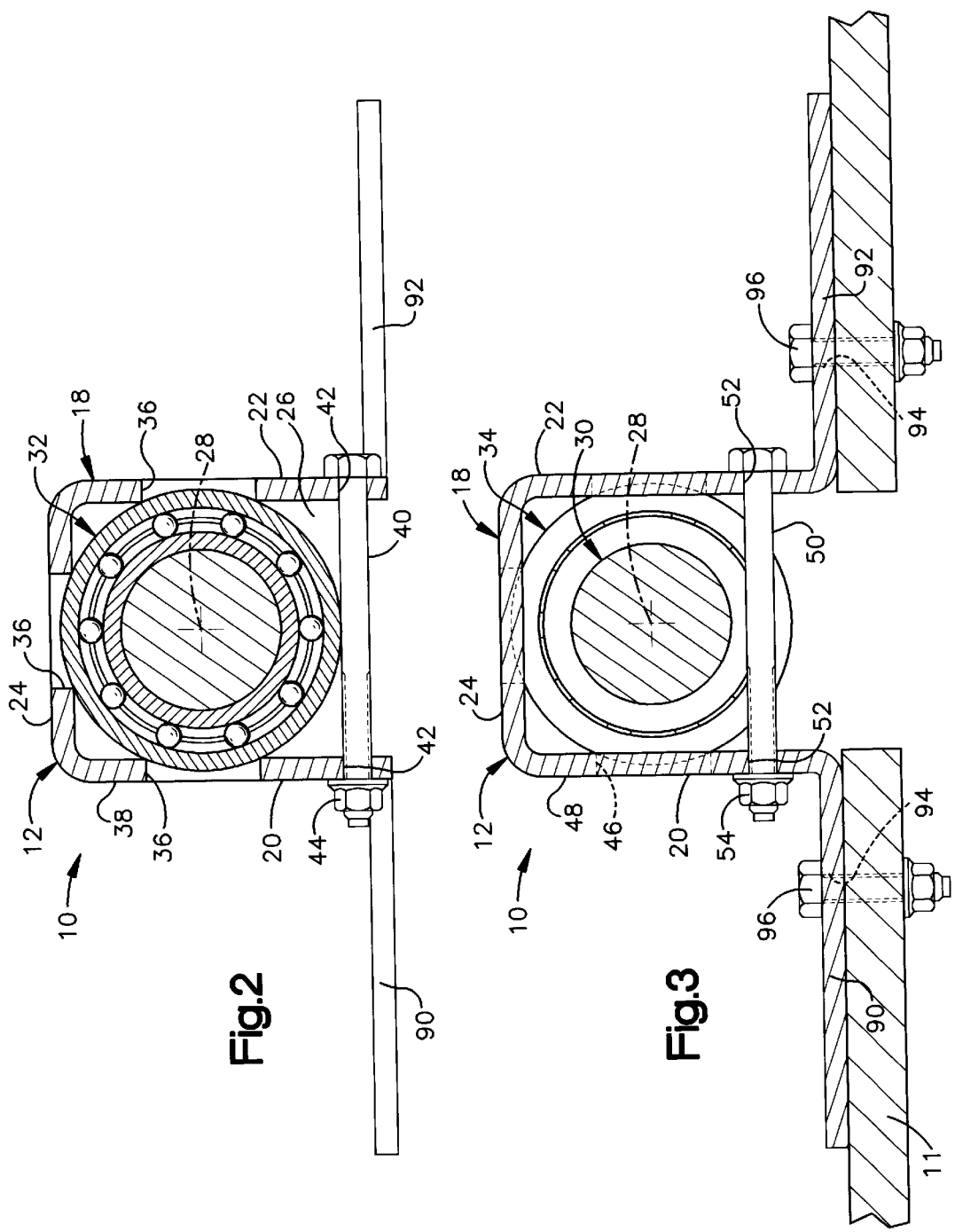

VEHICLE STEERING COLUMN

BACKGROUND OF THE INVENTION

1. Technical Field

The present invention relates to a vehicle steering column. In particular, the present invention relates to a steering column member that supports other components, such as the vehicle steering shaft, a steering wheel shroud, and accessory controls such as a turn signal and an air brake valve.

2. Description of Related Art

A typical vehicle steering column includes a support member, that is, a structural metal member fixed to the vehicle body that supports the steering shaft for rotation. The support member also supports other components, such the steering wheel shroud and accessory controls such as a turn signal and an air brake valve. The support member is typically a round tube onto which brackets are welded to support the other components and for supporting the steering column on the vehicle body. Welding support brackets onto the tube is done as a separate operation from the manufacture of the tube itself. Also, connecting other things with a round tube can be more difficult and costly than working with a rectangular tube.

SUMMARY OF THE INVENTION

The present invention is a vehicle steering column comprising a one-piece steering column member that includes a plurality of elongate wall portions that extend generally parallel to a longitudinal axis of the steering column. The plurality of wall portions at least partially define a chamber in the member for receiving an axially extending steering shaft of the vehicle. The steering column member has a generally rectangular configuration. The steering column member includes a vehicle mounting portion formed as one piece with the elongate wall portions. The vehicle mounting portion extends from the wall portions and is adapted for fastening the steering column member to the vehicle body.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 2 is a sectional view of the steering column of FIG. 1, taken along line 2—2 of FIG. 1;

FIG. 3 is a sectional view of the steering column of FIG. 1, taken along line 3—3 of FIG. 1.

DETAILED DESCRIPTION OF THE INVENTION

Figure 1:
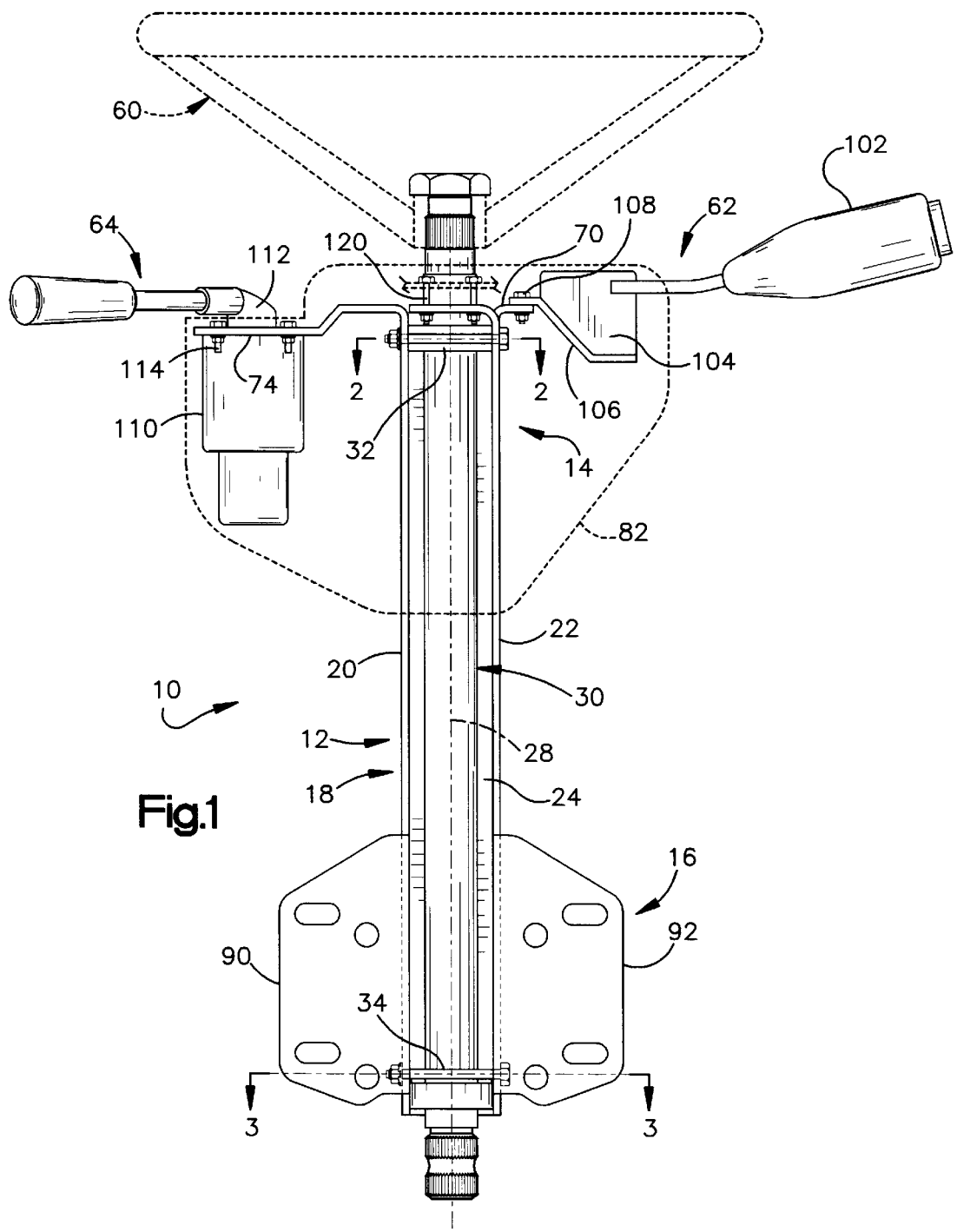
FIG. 1 is an elevational view of a vehicle steering column in accordance with a first embodiment of the present invention, including a steering column member.
Figure 4:
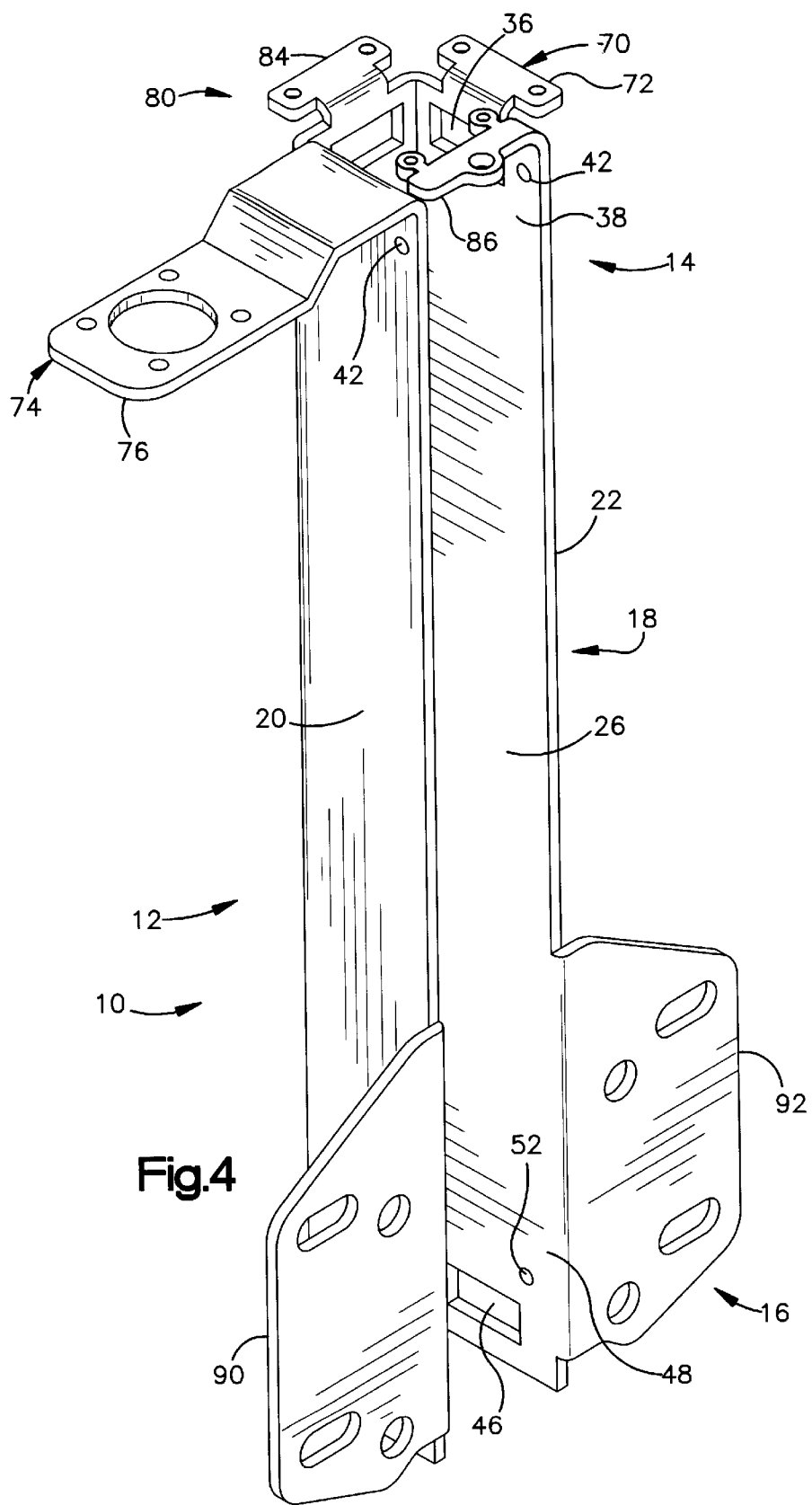
FIG. 4 is a perspective view of the steering column member of FIG. 1.

The present invention relates to a vehicle steering column. In particular, the present invention relates to a steering column member that supports other components, such as the steering shaft, the steering wheel shroud, and accessory controls such as a turn signal and an air brake valve.

As representative of the invention, FIGS. 1–4 illustrate a steering column 10. The steering column includes a steering column member 12. The steering column member 12 supports the other portions of the steering column 10 on the vehicle body 11. The steering column member 12 is formed as one piece from a single piece of structural material, such as metal or plastic. In the illustrated embodiment, the steering column member 12 is stamped from a single piece of sheet steel.

The steering column member 12 has a first end portion or upper end portion 14, and an opposite second end portion or lower end portion 16. An intermediate portion 18 of the steering column member 12 extends between and interconnects the first and second end portions 14 and 16.

The intermediate portion 18 of the steering column member 12 includes a plurality of elongate wall portions or walls. The walls include first and second side walls 20 and 22 and a back wall 24. The walls 20–22 extend generally parallel to each other.

The walls 20–24 define a chamber 26 (FIG. 4) inside the steering column member 12. The chamber 26 has a generally rectangular cross-sectional configuration. It should be understood that in accordance with the invention the walls 20–24 do not need to be configured to define a rectangular chamber 26; other shapes are possible for the chamber 26.

The walls 20–24 thus provide the steering column member 12 with a rectangular outer configuration. The rectangular outer configuration includes three planar walls, that is, the two side walls 20–22 and the back wall 24. The walls 20–24 define an axis 28 (FIGS. 1–3) that extends parallel to the walls. The axis 28 extends through the chamber 26 and forms a steering axis of the vehicle.

The steering column 10 includes a steering shaft 30. The steering shaft 30 is supported for rotation on the steering column member 12 in upper and lower bearings 32 and 34.

The upper bearing 32 is received in a multi-part opening 36 formed in an upper bearing support portion 38 of the steering column member 12. A crimp bolt 40 extends through openings 42 in the two side walls 20 and 22. A nut 44 is screwed on the crimp bolt 40. The crimp bolt 40 crimps the side walls 20 and 22 together to secure the upper bearing 32 in the upper bearing support portion 38 of the steering column member 12.

The lower bearing 34 is received in a multi-part opening 46 formed in a lower bearing support portion 48 of the steering column member 12. A crimp bolt 50 extends through openings 52 in the two side walls 20 and 22. A nut 54 is screwed on the crimp bolt 50. The crimp bolt 50 crimps the side walls 20 and 22 together to secure the lower bearing 34 in the lower bearing support portion 48 of the steering column member 12. As a result, the steering shaft 30 is supported on the steering column member 12 for rotation relative to the steering column member 12 about the axis 28.

The steering column 10 also includes the vehicle steering wheel 60. The steering wheel 60 is fixed to the steering shaft 30, in a known manner, for rotation with the steering shaft about the axis 28. The steering wheel 60 is located above (as viewed in FIG. 1) and thus outside of the upper end portion 14 of the steering column member 12.

The upper end portion 14 of the steering column member 12 includes a plurality of portions for mounting vehicle accessories, such as a turn signal assembly 62 and an air brake valve assembly 64. Specifically, the upper end portion 14 of the steering column member 12 includes a first mounting portion 70 for mounting a turn signal assembly 62 of the vehicle. The first mounting portion 70 comprises, in the illustrated embodiment, a flange 72 that extends outwardly from the side wall 22 in a direction away from the axis 28. The flange 72 is formed as one piece with the three walls 20–24 of the steering column member.

The upper end portion 14 of the steering column member 12 also includes a second mounting portion 74, for mounting an air brake valve assembly 64 of the vehicle. The second mounting portion 74 comprises, in the illustrated embodiment, a flange 76 that extends outwardly from the side wall 20 in a direction away from the axis 28. The flange 76 is formed as one piece with the three walls 20–24 of the steering column member.

The upper end portion 14 of the steering column member 12 also includes a third mounting portion 80, for mounting a steering wheel shroud 82 of the vehicle. The third mounting portion 80 comprises at least one flange that extends from one or more of the walls 20–24 in a direction toward or away from the axis 28. In the illustrated embodiment, the third mounting portion 80 comprises two flanges 84 and 86 that are formed as one piece with the three walls 20–24 of the steering column member 12.

The lower end portion 16 of the steering column member 12 includes structure for mounting the steering column member to the vehicle body 11. In the illustrated embodiment, that structure is a plurality of mounting pads or flanges 90 and 92. It should be understood that the flanges are only illustrative and the structure could include any structure, formed with the walls 20–24, that serves to help fasten the steering column member 12 to the vehicle body 11.

The mounting pads 90 and 92 are flanges that project from the walls 20–22, in a direction perpendicular to the walls. The flanges 90 and 92 are formed as one piece with the walls 20–24.

In the illustrated embodiment, the steering column member 12 includes two, trapezoidal-shaped flanges 90 and 92. Each one of the flanges 90 and 92 has a plurality of fastener openings 94. A plurality of fasteners in the form of bolts 96 extend through the fastener openings 94. The fasteners 96 secure the steering column member 12 to the vehicle body 11. As a result, the steering column member 12, and the entire steering column 10, are secured to the vehicle body 11 without any welding.

The steering column 10 includes a plurality of vehicle accessories that are mounted on the steering column member 12. The plurality of vehicle accessories includes the vehicle turn signal assembly 62 (FIG. 1). The turn signal assembly 62 includes a turn signal lever 102, a switch assembly 104, and a mounting portion 106. The mounting portion 106 is connected by fasteners 108 to the first mounting portion 70 of the upper end portion 14 of the steering column member 12. As a result, the turn signal assembly 62 does not require, for mounting to the steering column 10, another (separate) mounting bracket attached to the walls 20–24 of the steering column member 12.

The plurality of vehicle accessories also includes the air brake valve assembly 64 for controlling an air brake of the vehicle. The air brake valve assembly 64 includes an air brake valve 110 and a mounting portion 112. The mounting portion 112 is connected by fasteners 114 to the second mounting portion 74 of the upper end portion 14 of the steering column member 12. As a result, the air brake valve assembly 64 does not require, for mounting to the steering column 10, another (separate) mounting bracket attached to the walls 20–24 of the steering column member 12.

The steering column 10 also includes the steering wheel shroud 82. The steering wheel shroud 82 may be made as shown in U.S. Pat. No. 5,802,924. A plurality of fasteners in the form of bolts 120 secure the shroud 82 to the third mounting portion 80 of the upper end portion 14 of the steering column member 12. As a result, the shroud 82 does not require a separate mounting bracket attached to the steering column member 12.

From the above description of the invention, those skilled in the art will perceive improvements, changes and modifications in the invention. For example, the walls 20–24 of the steering column member 12 have planar exterior surfaces. As a result, it is easy to affix additional mounting flanges, or brackets, to the steering column member 12, if desired. In addition, the steering column member 12 can, itself, be formed with additional, or different, mounting portions other than those shown and described. Such improvements, changes and modifications within the skill of the art are intended to be covered by the appended claims.

Having described the invention, I claim:

1. A vehicle steering column comprising:

a one-piece steering column member comprising a plurality of elongate wall portions that extend generally parallel to a longitudinal axis of said steering column, said plurality of wall portions at least partially defining a chamber in said member for receiving an axially extending steering shaft of the vehicle, said steering column member having a rectangular exterior configuration;

said steering column member including a vehicle mounting portion formed as one piece with said elongate wall portions, said vehicle mounting portion extending from said wall portions and being adapted for fastening said steering column member to a vehicle body; and said steering column member including a shroud mounting portion formed as one piece with said elongate wall portions, said shroud mounting portion extending from said wall portions and being adapted for fastening a steering wheel shroud on said steering column member.

2. A steering column as set forth in claim 1 wherein said chamber has a rectangular cross-sectional configuration.

3. A steering column as set forth in claim 1 wherein said vehicle mounting portion comprises at least one mounting flange or pad having fastener openings for receiving fasteners for securing said steering column member to the vehicle body.

4. A steering column as set forth in claim 1 wherein said steering column member comprises a plurality of vehicle accessory mounting portions formed as one piece with said wall portions at an upper end portion of said steering column member.

5. A steering column as set forth in claim 1 wherein said steering column member comprises a plurality of bearing supports formed as one piece with said wall portions for engaging and supporting steering shaft bearings of said steering column.

6. A vehicle steering column comprising:

an elongate steering column member having first and second opposite end portions and an intermediate portion, said steering column member being formed as one piece;

said intermediate portion of said member comprising a plurality of elongate wall portions that extend generally parallel to each other and define a longitudinal axis of said steering column, said plurality of wall portions at least partially defining a chamber in said member for receiving an axially extending steering shaft of the vehicle;

said member having first and second bearing support portions adapted to support first and second bearings of the steering shaft and thereby support said steering shaft for rotation relative to said member;

said first end portion of said member having a first mounting portion extending from said wall portions and adapted to support a steering wheel shroud on said member, and a second mounting portion extending from said wall portions and adapted to support at least one vehicle control assembly on said member;

said member including a third mounting portion extending from said wall portions and adapted for fastening said member to a vehicle body.

7. A steering column as set forth in claim 6 wherein said third mounting portion comprises at least one pad or flange having fastener openings for securing said member to the vehicle body.

8. A steering column as set forth in claim 6 wherein said intermediate portion of said steering column member has a rectangular cross-sectional configuration.

9. A steering column as set forth in claim 8 wherein said intermediate portion of said steering column member has a plurality of planar exterior surfaces.

10. A steering column as set forth in claim 6 wherein said first and second bearing support portions of said steering column member are crimped onto said first and second bearings, respectively, to support said first and second bearings.

11. A steering column as set forth in claim 10 including a plurality of crimp bolts for crimping said first and second bearing support portions of said steering column member onto said first and second bearings.

12. A steering column as set forth in claim 6 wherein said first and second mounting portions of said steering column member comprise mounting flanges or brackets that are formed as one piece with said wall portions and that project away from said wall portions in a direction toward or away from said axis.

* * * * *